United States Patent
Murakami

(10) Patent No.: US 6,422,948 B1
(45) Date of Patent: Jul. 23, 2002

(54) HOLLOW SHAFT MEMBER FITTED TO MEMBER WITH HOLE

(76) Inventor: Yukiyoshi Murakami, 20-15, Minamihoncho 2-chome, Urawa-shi, Saitama-ken (JP)

(*) Notice: Subject to any disclaimer, the term of this patent is extended or adjusted under 35 U.S.C. 154(b) by 0 days.

(21) Appl. No.: 09/558,551

(22) Filed: Apr. 26, 2000

(30) Foreign Application Priority Data

Apr. 27, 1999 (JP) .......................................... 11-120750
Apr. 17, 2000 (JP) ....................................... 2000-115608

(51) Int. Cl.$^7$ ................................................ F16C 3/00
(52) U.S. Cl. .................................................... 464/183
(58) Field of Search ............................... 464/183, 162, 464/158

(56) References Cited

U.S. PATENT DOCUMENTS

| | | | | |
|---|---|---|---|---|
| 1,025,568 A | * | 5/1912 | Higgin | 464/183 |
| 4,622,840 A | * | 11/1986 | Diffender et al. | 72/283 |
| 5,235,734 A | * | 8/1993 | DuRocher et al. | 29/455.1 |
| 5,243,874 A | * | 9/1993 | Wolfe et al. | 74/493 |
| 6,193,612 B1 | * | 2/2001 | Craig et al. | 464/162 |

* cited by examiner

Primary Examiner—Lynne H. Browne
Assistant Examiner—Kenn Thompson
(74) Attorney, Agent, or Firm—Andrew C. Aitken; Venable Baetjer Howard & Civiletti, LLP

(57) ABSTRACT

A structure of shaft member has been developed in which the shaft member is made to be hollow to reduce its weight, installation into a ball bearing or a paper feed roller can be easily carried out and then an appropriate coupling of force can be attained between it and the objective member, wherein the shaft member 1 of the present invention relates to the hollow shaft member of metallic material in which it is fitted to the objective member having holes of bearing 2 and the like therein, its circular sectional plane is divided into three or more outer arcs $m_i$ (1,2,3 . . . ) and three or more inverse directed inner arcs $n_i$ (1, 2, 3 . . . ) are formed among the outer arcs, the hollow member is inserted into the objective member with the outer arcs and the inner arcs being compressed inwardly and deformed, and the objective member and the shaft member are coupled to each other by a resilient restitution force generated under said compression and deformation in order to satisfy a certain condition.

4 Claims, 11 Drawing Sheets

HOLLOW SHAFT MEMBER FITTED TO MEMBER WITH HOLE

BACKGROUND OF THE INVENTION

1. Technical Field of the Invention

This invention relates to a hollow shaft member to be fitted to a member having holes therein, and more particularly this invention mainly relates to a shaft member to be fitted to members having holes therein for a bearing or a paper feed roller or a paper presser roller and the like for office machines such as a printer for computer, a copying machine, a word processor, a facsimile device or the like, and an ATM. (Auto Tellers Machine) used in a financial organization, computer-based devices and measuring units etc.

2. Related Art

In the prior art, although the shaft members for use in installing a ball bearing, a paper feed roller or a paper presser roller and the like, for example, are used in the aforesaid office machines or ATM, a computer, a measuring device and the like, it is a normal matter that as the shaft members, a solid member is used (refer to FIG. 11).

However, such a solid member causes its weight to be heavy. Moreover, in the case that a size of fitting to a bearing hole, etc. is larger than that of a theoretical value when the end part of the solid member is fitted to the bearing hole of the ball bearing, it must be required to attain a precision in size in a unit of micron due to preventing the disadvantages such as a fatigue life, vibration, noise and generated heat to be produced. In addition, in order to perform a smooth rotation of it, it is also required to provide high circularity as well as a degree of coaxial state.

Accordingly, the prior art had a disadvantage that a manufacturing process becomes quite complex and a product cost is increased.

In addition, in the case that a member such as a paper feed roller or a paper presser rotor or the like is installed at the shaft member, a fitting female thread must be punched at the paper feed roller and the shaft member, and then a male screw is threadably engaged with the female thread to connect them to each other, resulting in that a required accurate positioning for fitting female thread and male thread each other make a manufacturing process be complicated.

SUMMARY OF THE INVENTION

The present invention has been developed in order to eliminate the aforesaid disadvantages, wherein the shaft member is made as a hollow member to reduce its weight, it can be easily installed at a ball bearing or a paper feed roller and an appropriate force coupling can be attained between it and an objective member under application of a structure of the shaft member.

The hollow shaft member of the present invention relates to a hollow shaft member made of metallic material to be fitted to an objective member such as a bearing member having holes therein, wherein its circular sectional plane is divided into three or more outer arcs $m_1$, $m_2$, $m_3$ . . . and three or more inverse directed inner arcs $n_1$, $n_2$, $n_3$ . . . are formed among the outer arcs, the hollow member is inserted into the objective member with the outer arcs and the inner arcs being compressed inwardly and deformed, and when the objective member and the shaft member are coupled to each other by a resilient restitution force generated under the compression and deformation, the aforesaid outer arcs $m_1$, $m_2$, $m_3$ . . . and inner arcs $n_1$, $n_2$, $n_3$ . . . satisfy the following conditions (1) to (4); i.e.

(1) a relation of $R_s > R_t$ should be kept, where $R_s$: a radius of sectional circle of the shaft member before its installation $R_t$: an inner radius of hole of an objective member to which the shaft member is fitted;

(2) a relation of $(Lm_1 + Lm_2 + Lm_3 \ldots) < 2\pi R_t$ should be kept, where $R_s$: a radius of circular sectional shape, $R_t$: an inner radius of hole of an objective member to which the shaft member is fitted $Lmi$: length of an outer arc $mi$ (i=1,2,3 . . . )

(3) Radii of curvature $\rho nsi$, $\rho msi$ of each of the arcs should be defined such that a resilient restitution force $F_t$ generated between the shaft member and the inner wall surface of a hole of the objective member by bending moments $M_{ni}$ and $M_{mi}$ described below, may become a value adapted for a coupling between the shaft member and the objective member.

$$M_{ni} = EA_{ni}\kappa_{ni}\rho_{nti}^2 \left( \frac{1}{\rho_{nsi}} - \frac{1}{\rho_{nti}} \right) \qquad \text{Equation (1)}$$

$\rho_{nsi}$: a radius of curvature of the axial line of the inner arc before its curved deformation $\rho_{nti}$: a radius of curvature of the axial line of the inner arc after its curved deformation fitted to an objective member E: a longitudinal elasticity of the shaft member $A_{ni}$: a sectional area per a unit of length of the inner arc $\kappa_{ni}$: a sectional coefficient of the inner arc by a bending moment $M_{ni}$ (i=1,2,3 . . . ) generated at the inner arc when the shaft member is compressed and deformed $$M_{mi} = EA_{mi}\kappa_{mi}\rho_{mti}^2 \left( \frac{1}{\rho_{msi}} - \frac{1}{\rho_{mti}} \right) \qquad \text{Equation (2)}$$

$\rho_{msi}$: a radius of curvature of the axial line of the outer arc before its curved deformation $\rho_{mti}$: a radius of curvature of the axial line of the outer arc after its curved deformation fitted to an objective member E: a longitudinal elasticity of the shaft member $A_{mi}$: a unit sectional area of the outer arc $\kappa_{mi}$: a sectional coefficient of the outer arc by a bending moment $M_{mi}$(i=1,2,3 . . . ) generated at the outer arc when the shaft member is compressed and deformed (4) Extensions of the symmetrical lines $C_1$, $C_2$, $C_3$. of the inner arcs $n_1$, $n_2$, $n_3$ . . . should pass through a center O of a circle S and the symmetrical lines $C_1$, $C_2$, $C_3$ . . . are crossed to each other at an equal angle. In reference to the aforesaid configurations, the present invention may provide the following superior effects.

(1) The present invention based on the aforesaid configuration is not only light in weight but also can be manufactured quite easily as compared with the prior art shaft member if a drawing work with female mold dies having outer arc and inner arc formed therein as well as the dies, it can be manufactured quite easily, so that its manufacturing step can be remarkably simplified.

(2) Proper setting of the radii of curvature of the outer arc and the inner arc enables a resilient restitution force required for coupling with the objective member to be attained and in the case of coupling with a ball bearing, for example, it is possible to set an inner clearance to a value not exceeding its theoretical value.

In addition, in the case of coupling with a paper feed roller and a paper presser roller and the like, it is possible to attain a high coupling state durable against it and an appropriate setting of radii of curvature of the outer arc and the inner arc in advance enables a proper setting to be carried out against an expected requite coupling force.

(3) Since high circularity can be sufficiently provided under arrangement of the symmetrical line of the inner arc toward the center point and an equal distribution arrangement, a smooth rotation of the shaft member is assured and an irregular rotation called as an improper action can be prevented.

DESCRIPTION OF THE PREFERRED EMBODIMENTS

The shaft member of the present invention is mainly applied to office equipment such as a printer for computer, a copying machine, a word processor and a facsimile or the like, an ATM used in financial organization, a computer equipment and a measuring device or the like and further the shaft corresponds to a shaft member to be fitted to a member having holes therein.

Figure 8A:
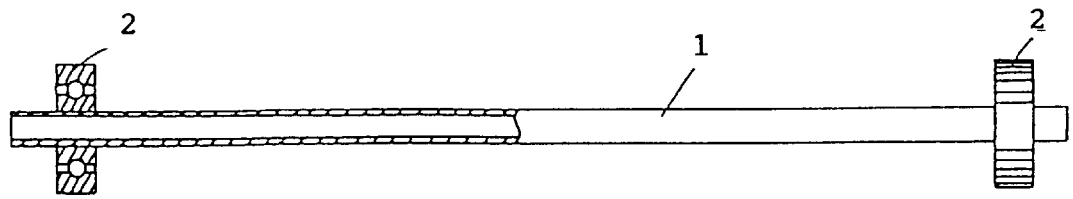
FIG. 8(A) is a front elevational view partly cut-away to show a state in which the objective member is installed at the shaft member of the present invention and to show a situation in which a ball bearing is installed.
Figure 8B:
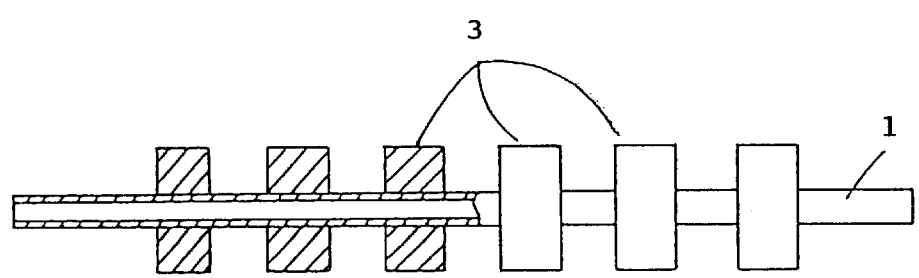
FIG. 8(B) is a front elevational view partly cut-away to show a state in which the objective member is installed at the shaft member of the present invention and to show a situation in which the paper feed roller is installed.
Figure 8C:
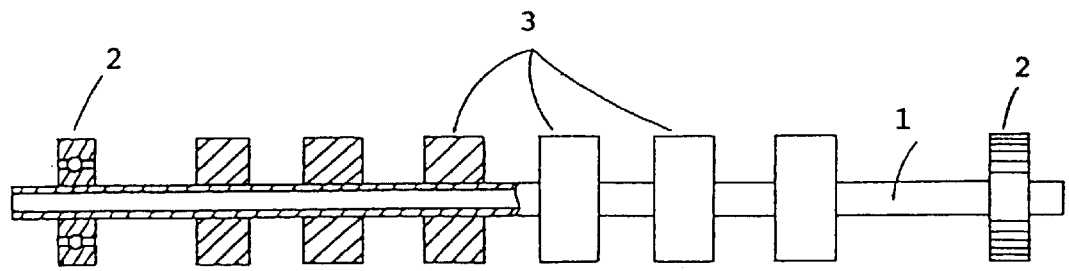
FIG. 8(C) is a front elevational view partly cut-away to show a state in which the objective member is installed at the shaft member of the present invention and to show a situation in which a ball bearing and a paper feed roller are installed.
Figure 9:
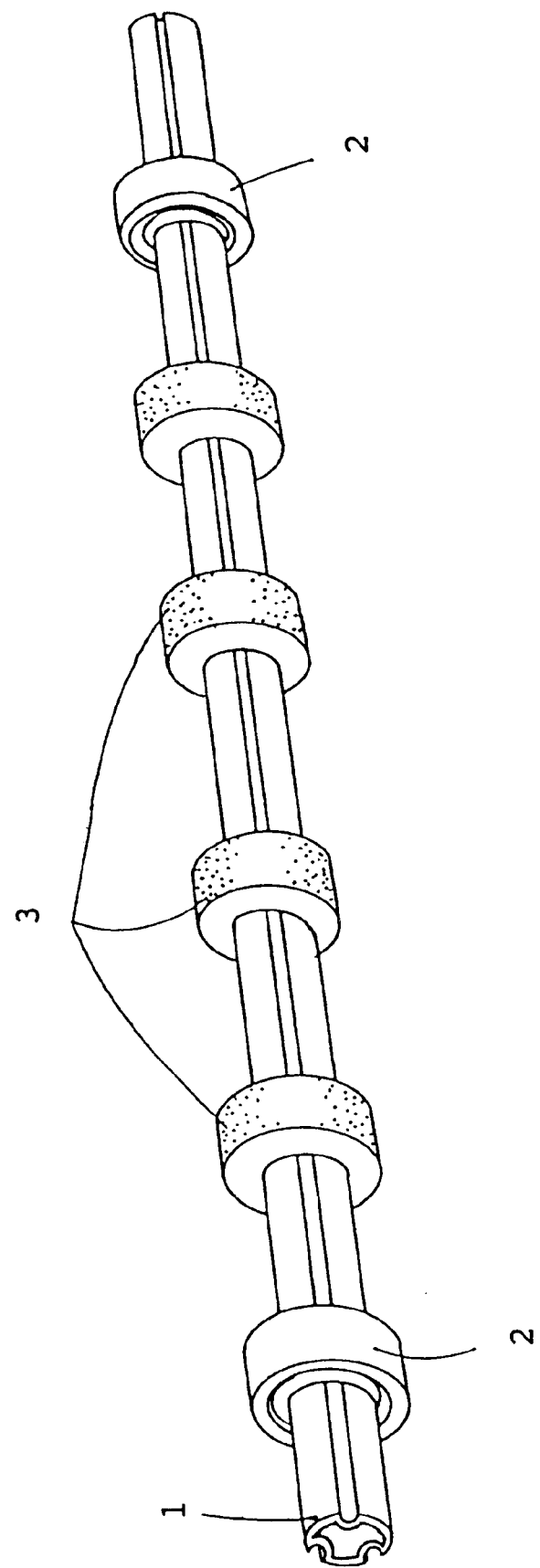
FIG. 9 is a perspective view for showing the shaft member of the present invention under a state in which a ball bearing and a paper feed roller are installed.
Figure 10:
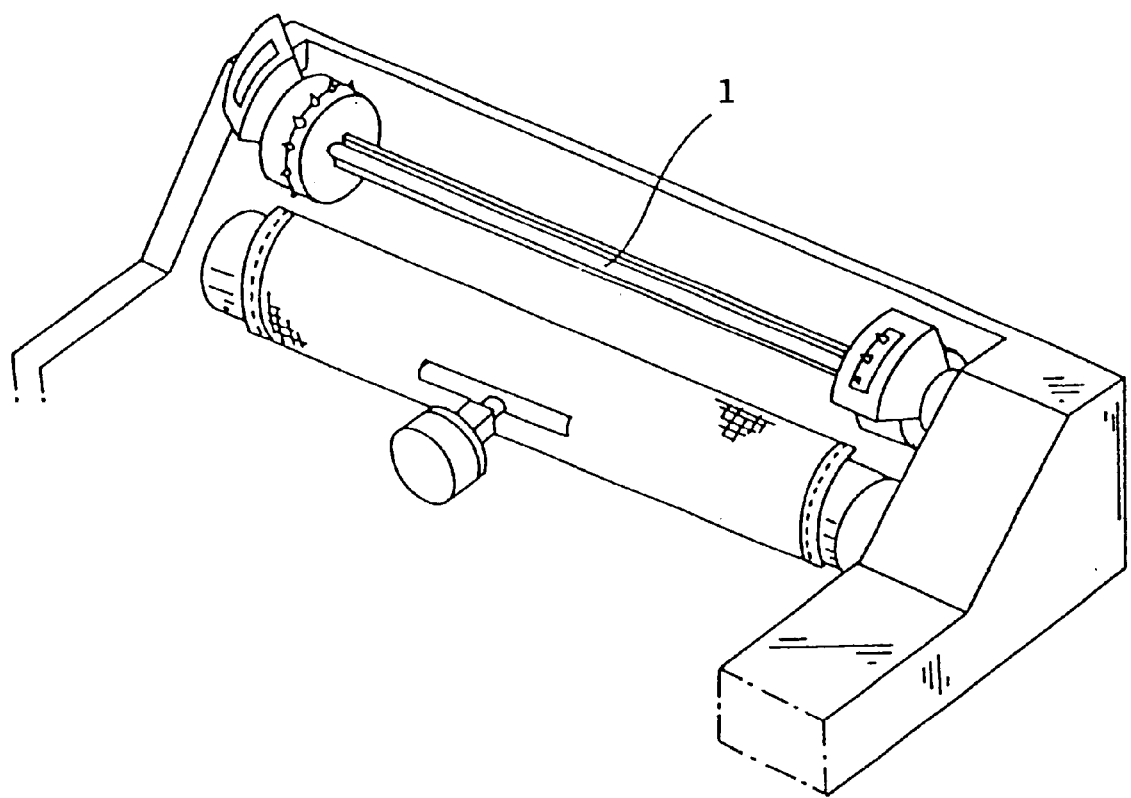
FIG. 10 is a perspective view for showing a printer to which the shaft member of the present invention is applied.
Figure 11:
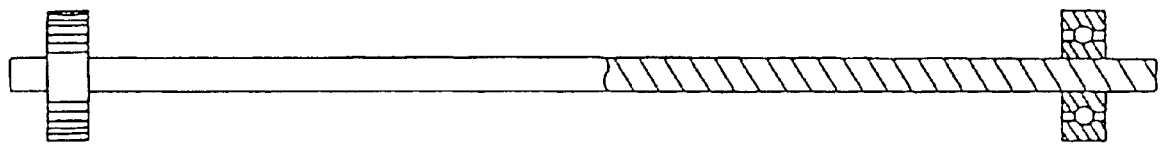
FIG. 11 is a front elevational view partly cut-away to show the shaft member under a state in which the prior art ball bearing is installed.

More practically, there are provided some cases, i.e. (1) a case in which both ends are fitted to bearing holes of a ball bearing as shown in FIGS. 8(A) to 8(C), for example (refer to FIG. 8(A)); (2) another case in which a paper feed roller or a paper presser roller are provided at predetermined positions on the shaft member (refer to FIG. 8(B)); and (3) a still further case in which the aforesaid (1) and (2) are made to be combined (refer to FIG. 8(C)) or the like.

These members having holes such as the ball bearing, the paper feed roller and the paper presser roller or the like are hereinafter called as objective members.

Figure 1:
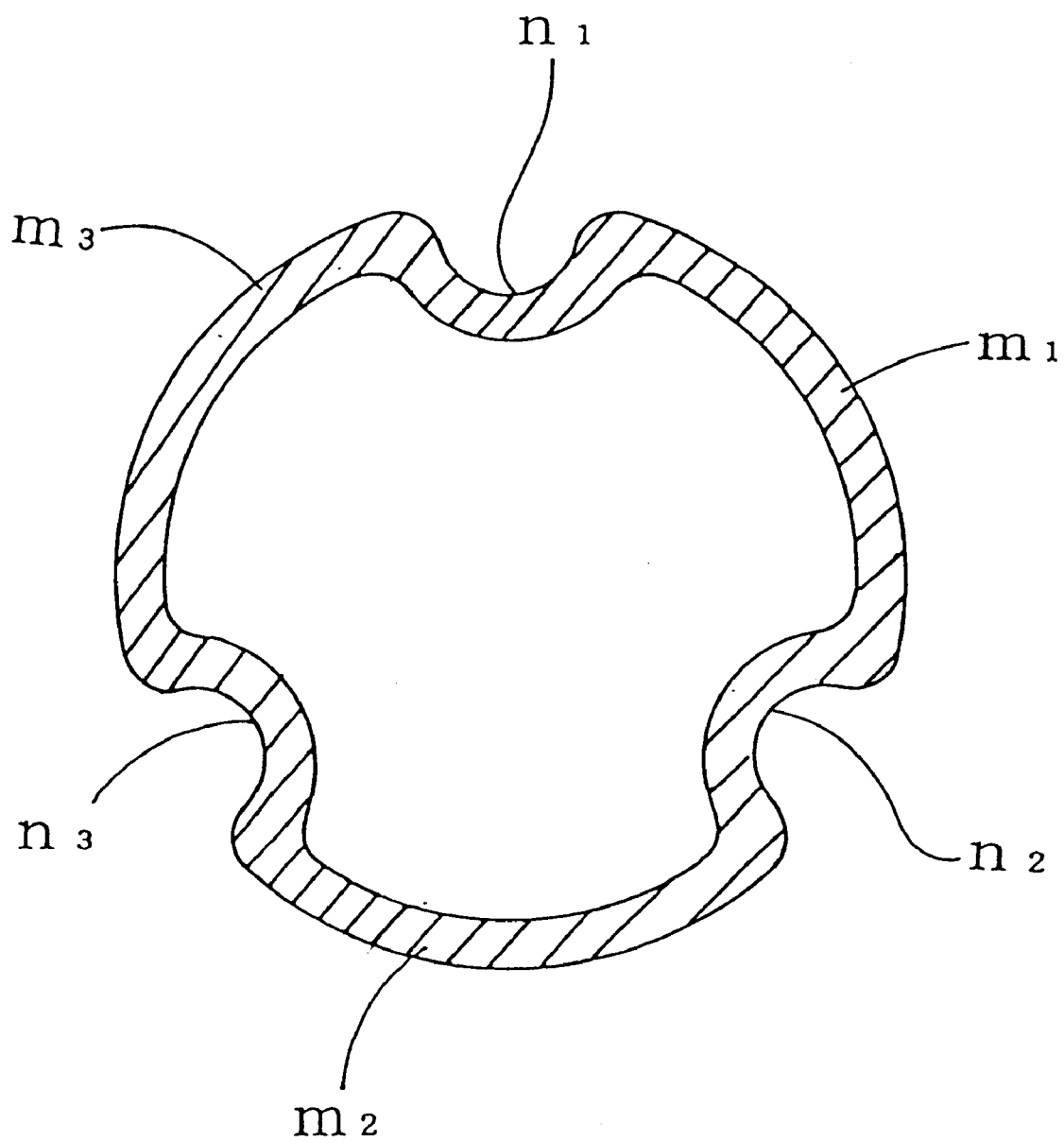
FIG. 1 is a side elevational view in section for showing the shaft member of the present invention.

In the case of the shaft member described above, the present invention is made such that its material is metal, the shaft member is a hollow member, it forms a cylinder having a circular section, and in the case that its sectional circle is defined as S, this circle S is divided into three or more arcs $m_1, m_2, m_3 \ldots$ (hereinafter merely called as an "outer arc $m_i$") and then three or more inverse directed arcs $n_1, n_2, n_3 \ldots$ (hereinafter merely called as an "inner arc $n_i$") are formed (refer to FIG. 1).

The reason why the outer arcs and inner arcs are provided is that the outer arc $m_i$ and the inner arc $n_i$ are compressed inwardly and deformed to cause the shaft member to be inserted into the holes of the objective member and then the objective member and the shaft member are coupled to each other by a resilient restitution force generated by the compression.

Accordingly, in order to attain the restitution force and make the value of restitution force appropriate, the outer arc $m_i$ and the inner arc $n_i$ shall satisfy the following conditions.

Although metal of the material corresponds more practically to SUS304 and steel or the like, it should be understood that the metal is not limited to this material.

Figure 2A:
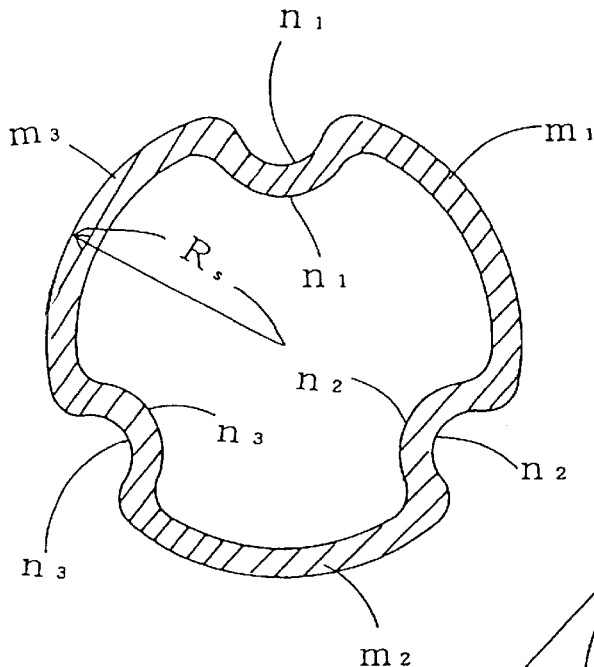
FIG. 2(A) is a sectional view for showing a state before compression in which the shaft member of the present invention is compressed and deformed.
Figure 2B:
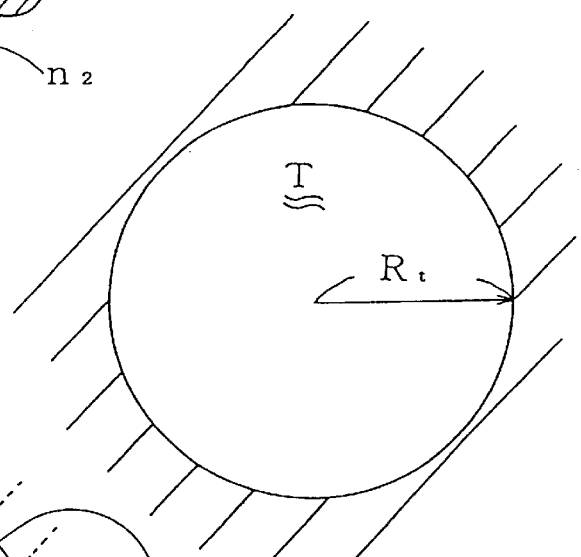
FIG. 2(B) is a sectional view for showing a hole of an objective member at a stage in which the shaft member of the present invention is compressed and deformed.
Figure 2C:
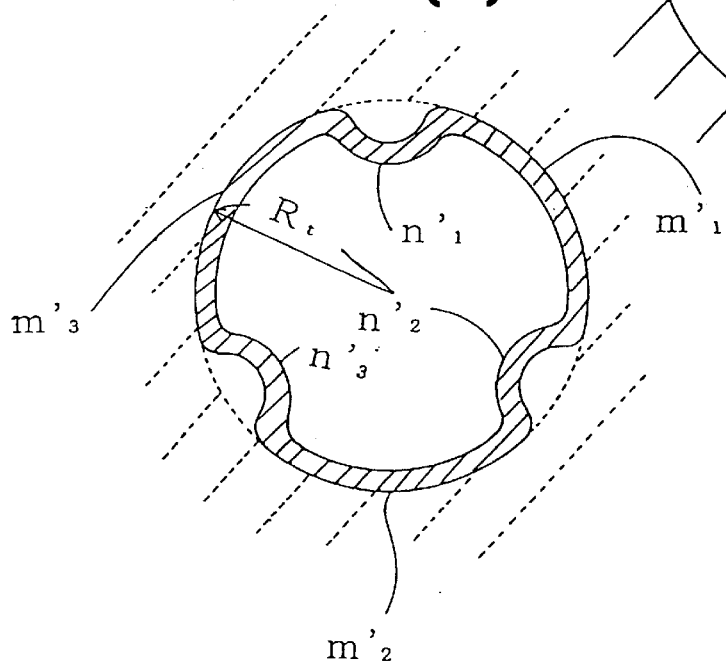
FIG. 2(C) is a sectional view for showing a state in which the shaft member is fitted into the hole of the objective member during a process for compressing and deforming the shaft member of the present invention.

A first condition is set such that at first when a sectional circle of hole formed in the objective member to Ad which the shaft member is installed is defined by T and a radius of the circle T is defined by $R_t$, the radius $R_s$ of the above circle S shall be larger than the radius $R_t$ of the circle T, that is, a relation of $R_s \geq 2 R_t$ shall be attained (refer to FIGS. 2(A) to 2(C)).

This is a required condition for attaining a resilient restitution force caused by the shaft member of the present invention to be described later.

Next, it is assumed that a total length of arcs of the aforesaid outer arc $m_i$ shall be shorter than an inner circumferential length of the hole circle T of the objective member, i.e.

$$(Lm_1+Lm_2+Lm_3\ldots)<2\pi R_t$$

$R_t$: an inner radius of the hole of the objective member for fitting to the shaft member $L_{mi}$: a length of an outer arc $m_i$ (i=1,2,3 . . . )

A reason for this relation consists in the fact that this relation causes the resilient restitution force generated by the haft member of the present invention to be realized and when the shaft member is compressed, the shaft member is stored in the hole circle T of the objective member.

Then, compressed curvature states of the aforesaid outer arc $m_i$ and inner arc $n_i$ are defined as follows.

Figure 3A:
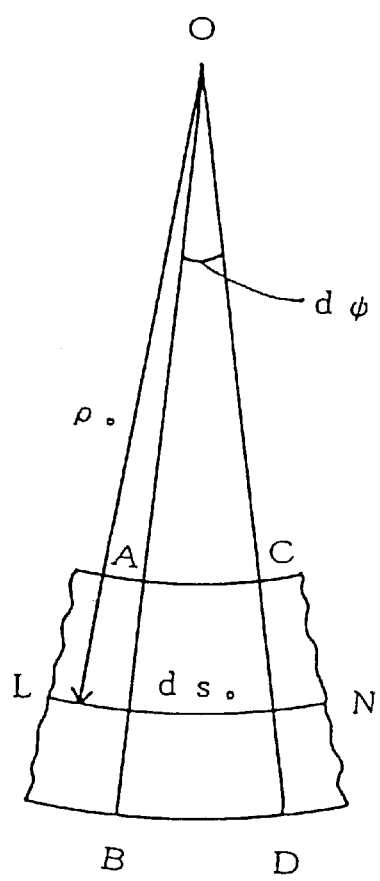
FIG. 3(A) is a schematic view for showing a pre-curved state to indicate a curved deformation of a curved beam in model formation.
Figure 3B:
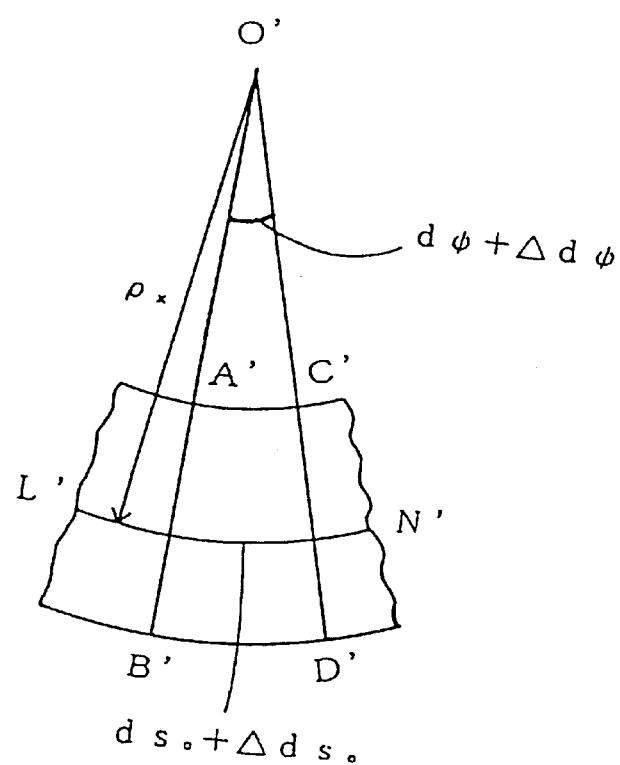
FIG. 3(B) is a schematic view for showing a post curved state to indicate a curved deformation of a curved beam in model formation.

At first, in reference to the arcs such as the outer arc $m_i$ and the inner arc $n_i$ as mathematical model, a bending moment per a unit of length generated when the curved deformation is produced can be expressed as follows in general.

$$M_o = E_o A_o \kappa_o \rho_\chi^2 \left(\frac{1}{\rho_o} - \frac{1}{\rho_\chi}\right) \qquad \text{Equation (a)}$$

where, $E_o$: a longitudinal elasticity of the member $A_o$: a sectional area per a unit of length of the member $\kappa_o$: a sectional coefficient of the member That is, as shown in FIG. 3, in the case that a bending beam member with a radius of curvature in respect to an axial line LN being as $\rho_o$ and an angle formed between a plane AB and a plane CD defining as $d\Psi$, has been curved and deformed to one with a radius of curvature in respect to an axial line L'N' being as $\rho_\chi$ and an angle between a plane A'B' and a plane C'D' defining as $d\Psi+\Delta d\Psi$, it can be expressed as Equation (b).

$$\frac{1}{\rho_\chi} = \frac{1}{\rho_o} + \frac{\omega - \varepsilon_o}{\rho_o} = \frac{1}{\rho_o} + \frac{M_o}{E_o A_o \kappa_o \rho_o^2} \qquad \text{Equation (b)}$$

where

ω: aerate of variation of the angle $d\Psi$.

εo: a strain on the axial line LN

The above equation (a) can be attained in reference to the equation (b).

Figure 5:
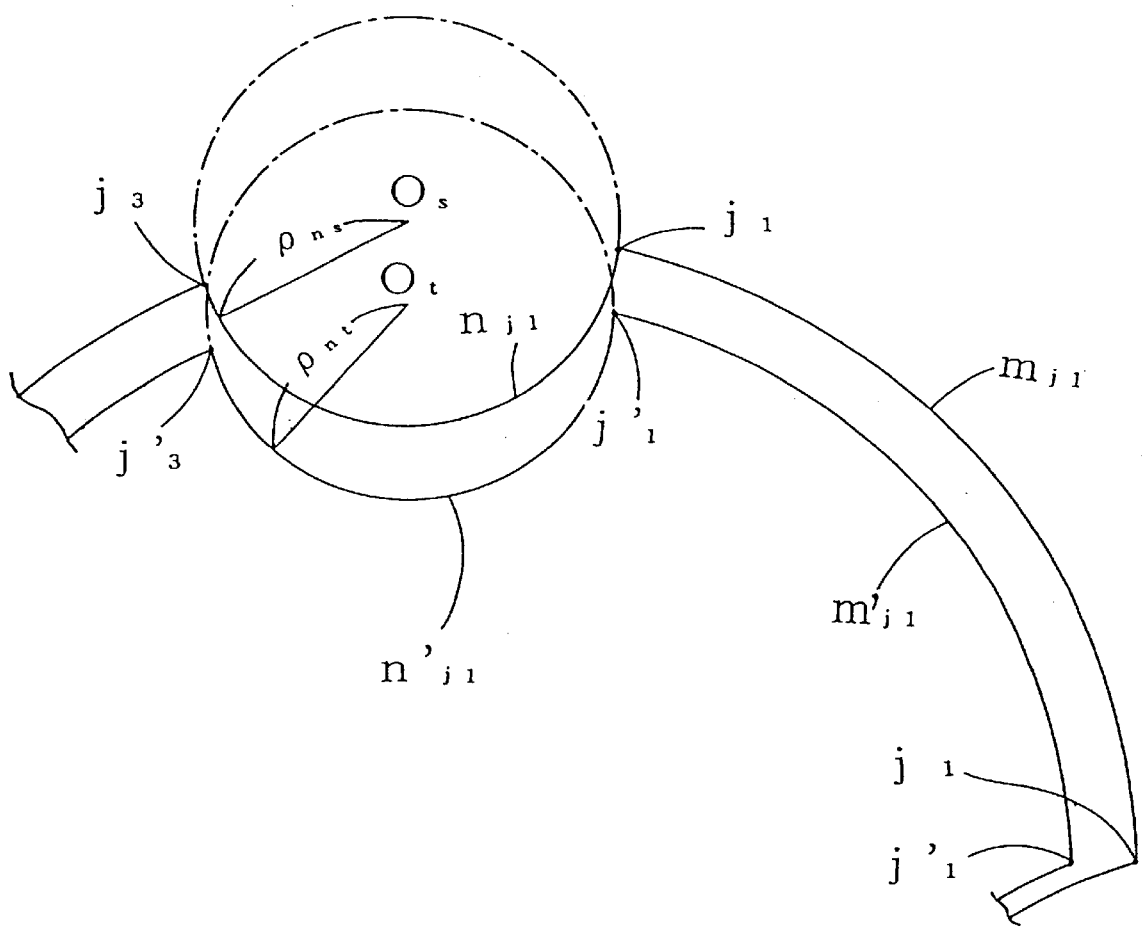
FIG. 5 is an enlarged view for showing a part of FIG. 4.

And then, at first, as shown in FIG. 5, referring to the inner arc $n_i$, in the case that a radius of curvature of the inner arc $n_i$ (i=1,2,3 . . . ) before performing a compressive compressive deformation is defined as $\rho_{nsi}$, a radii of curvature of $n'_1$, $n'_2$, $n'_3$ . . . formed after the compressive deformation (after it is installed in the hole T of the objective member to be described later) is defined as $\rho_{nti}$, a longitudinal elasticity of the shaft member is defined as E, a sectional area per a unit of length of the inner arc is defined as $A_{ni}$ and a sectional coefficient of the inner arc is defined as $\kappa_{ni}$, a moment $M_{ni}$ (i=1,2,3 . . . ) generated at the compressed inner arcs $n'_1$, $n'_2$, $n'_3$ . . . , can be expressed as Equation (1).

$$M_{ni} = EA_{ni}\kappa_{ni}\rho_{nti}^2\left(\frac{1}{\rho_{nsi}} - \frac{1}{\rho_{nti}}\right) \qquad \text{Equation (1)}$$

Figure 4:
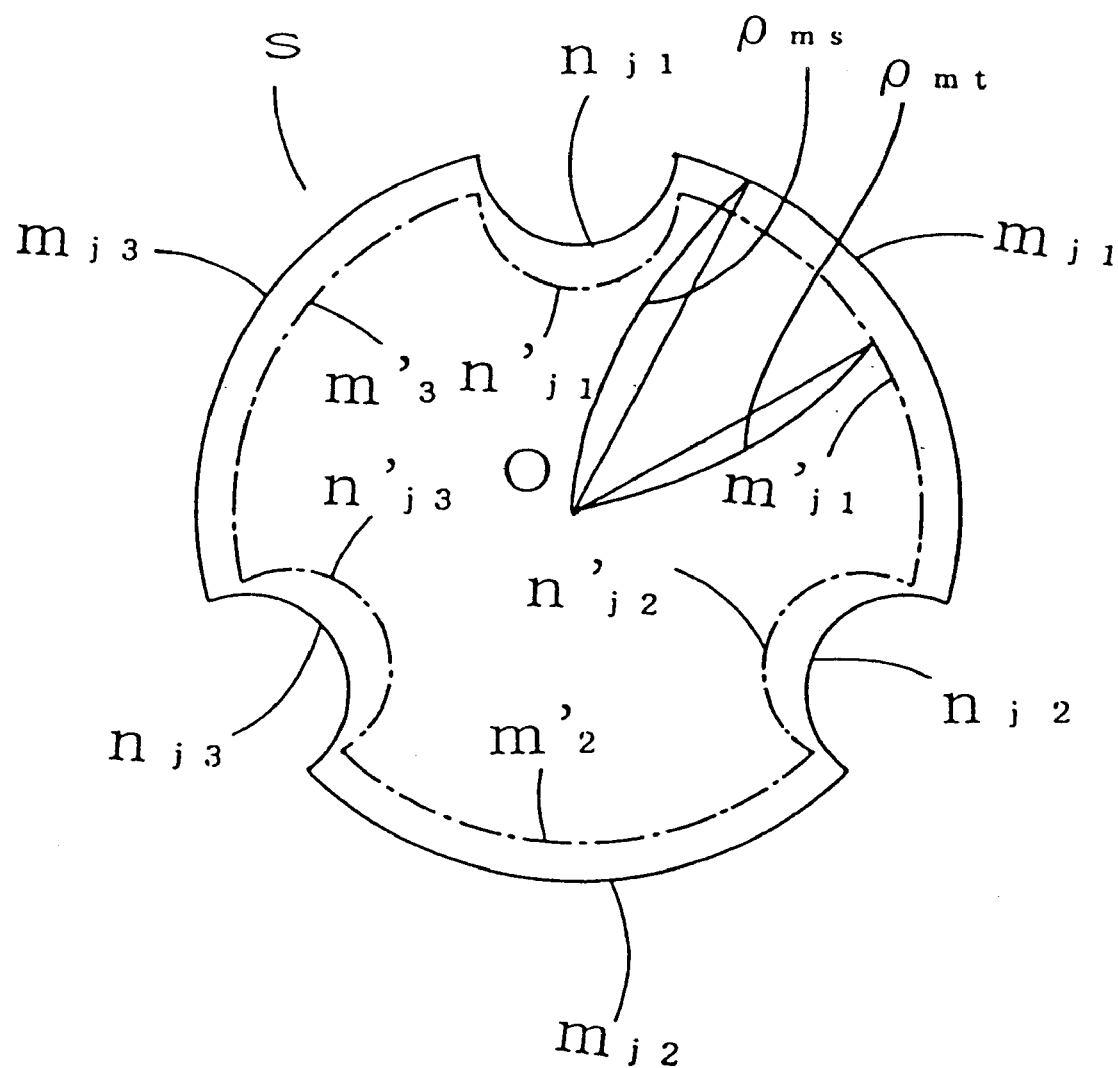
FIG. 4 is a side elevational view for showing a compressed deformation state in section of the shaft member of the present invention as shown by its axial line.

That is, as shown in FIGS. 4 and 5, in the case that the shaft member is compressed down to such a small diameter less than that of an inner circumference of the hole in the objective member and the end part of the shaft member is fitted into the hole, and further in the case that axial lines of the outer arc mi before compression are defined as $m_{j1}$, $m_{j2}$, $m_{j3}$ . . . , the outer arcs $m_1$, $m_2$, $m_3$ . . . are fitted to the inner circumferential surface of the hole T and then the fulcrum points $j_1$, $j_3$ are moved to the fulcrum points $j'_1$, $j'_3$. Then, the fulcrum points $j_1$, $j_3$ may also act as the fulcrum points of the inner arc $n_i$ (the axial lines of the inner arc are defined as $n_{j1}$, $n_{j2}$, $n_{j3}$ . . . ) and so motion of the fulcrum points $j_1$, $j_3$ to the fulcrum points $j'_1$, $j'_3$ causes width of the fulcrum point to be narrowed against the inner arc $n_i$, resulting in that this action may produce a force for bending the inner arc $n_i$ to an inward direction.

As a result, $\rho_{ns1}$ being the radius of curvature of the inner arc $n_1$ is changed to $\rho_{nt1}$ being the radius of curvature of the inner arc $n'_1$.

The curved deformation is within a range of resilient deformation, a bending moment is generated at the inner arc $n_i$ and that value becomes one as indicated in the above Equation (1).

The inner arcs $n'_2$, $n'_3$ are similarly processed.

In turn, also at the outer arcs $m_1$, $m_2$, $m_3$ . . . in the case that radii of curvature of the outer arcs $m_1$, $m_2$, $m_3$ are defined as $\rho_{msi}$; radii of curvatures of outer arcs $m'_1$, $m'_2$, $m'_3$ . . . are defined as $\rho_{mti}$ formed after it is installed in the hole T of the objective member; a longitudinal elasticity of the shaft member is defined as E, a sectional area per a unit of length of the outer arc is defined as $A_{mi}$ and a sectional coefficient of the outer arc is defined as $\kappa_{mi}$, in the same manner as that of the inner arc $n_i$, it can be expressed as Equation (2).

$$M_{mi} = EA_{mi}\kappa_{mi}\rho_{mti}^2\left(\frac{1}{\rho_{msi}} - \frac{1}{\rho_{mti}}\right) \qquad \text{Equation (2)}$$

As a result, a total amount $M_t$ of restituting bending moments generated when the shaft member is compressed in the hole of the objective member becomes as follows:

$$(M_{m1}+M_{m2}+M_{m3}\ldots)+(M_{n1}+M_{n2}+M_{n3}\ldots)=M_t$$

Then, the force of the bending moment $M_t$ is realized as a restitution force $F_t$ acting against the wall of the hole of the objective member, resulting in that this force causes the shaft member to be coupled with the hole of the objective member.

Then, a force $F_o$ required when the shaft member is installed at the objective member will be studied.

For example, an appropriate fitting size to a bearing hole must be kept at a bearing hole of a ball bearing to prevent a fatigue life, vibration, noise and generated heat or the like. In the case that the shaft member is fitted to the bearing hole, it should be avoided that the shaft member presses the inner hole more than that requisite for operation to loosen the inner clearance excessively. Accordingly, in the case that the shaft member is fitted to the objective member, it is necessary to restrict it to a restitution force less than a specified value.

In turn, in the case that the shaft member is installed at the paper feed roller or the paper presser roller, a certain torque is generated as the paper is fed or the paper is pressed. Accordingly, a restitution force more than a specified value is required for performing a fitting operation between the shaft member and the objective member in order to endure against this load.

As described above, as a force $F_o$ required when the shaft member is installed at the objective member, it is required to have a restitution force less than a certain value or more than a certain value in regard to the objective member.

In view of the foregoing, a relation between a resilient restitution force $F_t$ generated due to a bending moment $M_t$ between the shaft member and the inner wall surface of the bearing and a force $F_o$ required when the shaft member is installed at the objective member, will be studied.

(1) At first, in the case that both ends are fitted to the bearing holes of the ball bearing, it must be set to a certain value or less so as not to make the inner clearance narrow and if the value is set to $F_{o1}$, the values of $\rho_{nsi}$, $\rho_{msi}$ of the inner arc $n_i$ and the outer arc $m_i$ are set such that a relation of $F_t < F_{o1}$ can be attained.

(2) Next, in the case that the paper feed roller or the paper presser roller is installed at a predetermined intermediate position, it must be set to a value or more of a torque generated through its rotation and if the value is set to $F_{o2}$, the values of $\rho_{nsi}$, $\rho_{msi}$ of the inner arc $n_i$ and the outer arc $m_i$ are set such that a relation of $F_t > F_{o2}$ can be attained.

(3) Further, in the case that the aforesaid (1) and (2) are made to be combined, it must be set to have a relation of $F_{o1} > F_t > F_{o2}$, and it must be within a specified range such that the values of $\rho_{nsi}$, $\rho_{msi}$ of the inner arc $n_i$ and the outer arc $m_i$ satisfy it.

However, it may be assumed to be difficult that it satisfies physically a condition of $F_{o1} > F_t > F_{o2}$. In view of this fact, although the inner diameter of the bearing hole of the bearing can not be changed, this problem can be solved by setting the inner diameter of the hole of the roller to a smaller value to satisfy a relation of $F_t > F_{o2}$, after setting the values of $\rho_{nsi}$, $\rho_{msi}$ of the inner arc $n_i$ and the outer arc $m_i$ to satisfy a relation of $F_t < F_{o1}$, in view of the fact that the inner diameter of each of the holes of the paper feed roller and the paper presser roller can be changed.

In the case that this radius of curvature is to be calculated, at first, the hole T of the objective member is well known and $F_o$ is set in advance, so that a calculation is started from $F_o$ to attain $M_t$ satisfying a relation of $F_t > F_o$, set $\rho_t$ in reference to the value of $M_t$ and lastly set $\rho_s$.

At this time, each of the arcs forming the outer arcs m, m' and the inner arcs n, n' is present between $\rho_t$ and $\rho_s$ as shown in FIGS. 4 and 5 and the arc lengths of the outer arc m and the inner arc n and the arc lengths of the outer arc m' and the inner arc n' are equal, so that they can be calculated in reference to an equation of circle. However, since the method of calculation is not directly related to the present invention, its description will be eliminated.

Figure 6:
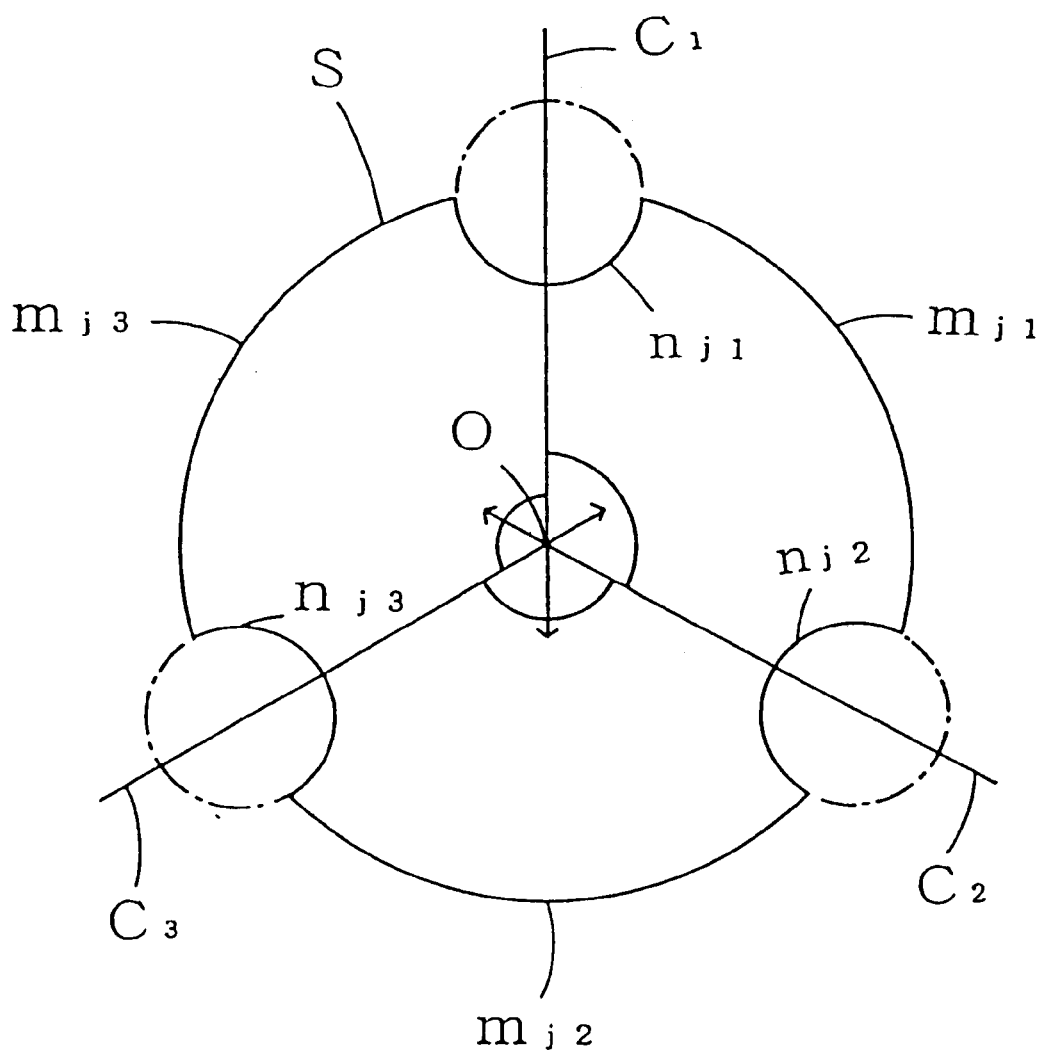
FIG. 6 is a side elevational view for showing a state of symmetrical line of the inner arc of the shaft member of the present invention in regard to its axial line.

Next, the fourth condition is set such that as shown in FIG. 6, the arc symmetrical lines $C_1$, $C_2$, $C_3$ . . . of the inner arcs $n_1$, $n_2$, $n_3$ . . . may pass through the center point O of the circle S when they are extended, in addition, angles formed by these symmetrical lines are set to be equal to each other and in the case of three division, the angle is set to be 120°.

That is, the inner arcs $n_1$, $n_2$, $n_3$ . . . are set such that their symmetrical lines may be crossed at the center of the circle S and they are dispersed to have an equal angle to each other.

This arrangement is set to have high circularity and to cause the restitution forces generated at each of the arcs to be directed toward the center of the circle and further to cause each of the forces to be balanced.

Then, an action of the preferred embodiment will be described as follows.

Figure 7A:
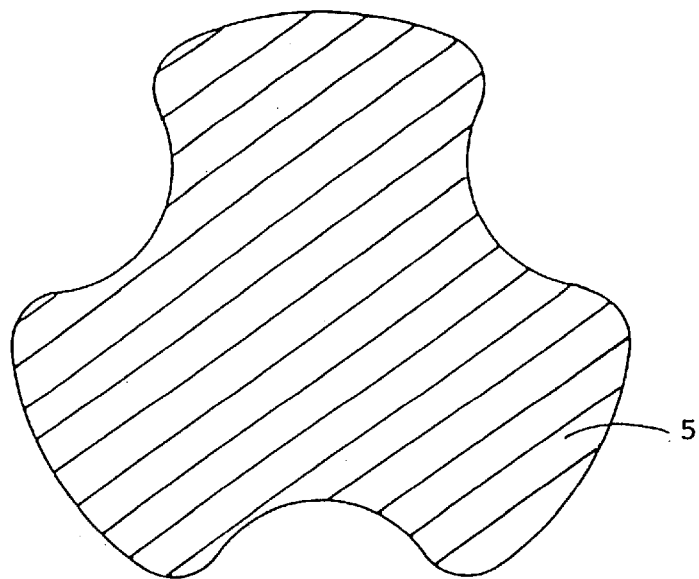
FIG. 7(A) is a sectional view for showing a core mold of a drawing die at a manufacturing process of the shaft member of the present invention.
Figure 7B:
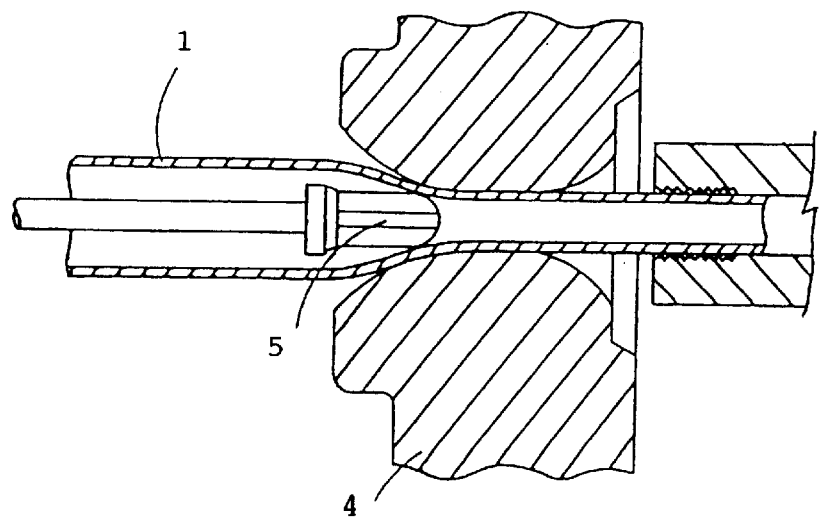
FIG. 7(B) is a sectional view for showing a state for performing a drawing operation with a die having a core and a female mold die combined to each other during the manufacturing process for the shaft member of the present invention.

At first, in order to manufacture the shaft member of the present invention, a drawing die having a female mold die 4 with outer arcs $m_1$, $m_2$, $m_3$ . . . and inner arcs $n_1$, $n_2$, $n_3$ . . . and a core mold die 5 combined to each other as shown in FIG. 7 is manufactured, a shaft having an inner circumference approximately equal to a total length of the arcs is prepared and this material is drawn. At this time, in the case that it is difficult to manufacture it through one drawing work, an outer shape die of middle form is prepared and a drawing work is carried out at a second time operation as shown in FIG. 7. Then, the shaft member formed by metallic material is formed by such a drawing die work into the shaft member having a predetermined shape.

Then, this shaft is installed at the objective member such as a ball bearing and the like. However, at that time, the shaft member can not be inserted as it is because a relation of $$R_s > R_t$$

is provided where $R_s$ is defined as a radius of a sectional circle of the shaft member before installation and $R_t$ is defined as an inner radius of a hole of an objective member to which the shaft member is installed.

In view of the foregoing, as the method for inserting the shaft member, there are provided two kinds of method, for example. One method is carried out such that a restricting member is applied and once a hollow shaft is compressed in an inward direction to attain its diameter from the inner diameter $R_t$ of the objective member to a small diameter, deformed and inserted into the objective member. The other method is carried out such that an inserting extremity end of the shaft member is cut into a tapered shape, the shaft member is abutted against the hole of the objective member under utilization of the tapered surface, the shaft member is pushed by an inserting machine using a hydraulic cylinder at the rear surface of the shaft member, the shaft member is inserted while it is being compressed inwardly with the pushing force and also being deformed. Any one of these methods can be employed.

Then, since the shaft member of the present invention is made such that inverse inner arcs $n_1$, $n_2$, $n_3$ . . . are formed among the outer arcs $m_1$, $m_2$, $m_3$ . . . , it can be entirely compressed in an inward direction, at first the outer arcs $m_1$, $m_2$, $m_3$ . . . are pushed inside and shrunk inwardly around the center O.

In FIGS. 4 and 5 is illustrated the state of axial line at this time, wherein the axial lines $m_{j1}$, $m_{j2}$, $m_{j3}$ . . . of the outer arc $m_i$ are shrunk inwardly to become $m'_{j1}$, $m'_{j2}$, $m'_{j3}$ . . . , resulting in that fulcrum points $j_1$, $j_1$, $j_2$, $j_2$, $j_3$, $j_3$ . . . at both ends are moved to $j'_1$, $j'_1$, $j'_2$, $j'_2$, $j'_3$, $j'_3$ . . . .

Since the fulcrum points may also act as fulcrum points of the inner arc $n_i$, the inner arc $n_i$ is narrowed due to a movement of the fulcrum points, wherein the inner arc $n_1$ is narrowed with the fulcrum points $j_1$ and $j_3$ as shown in FIG. 5, for example, an axial line $n_{j1}$ of the inner arc $n_1$ is substantially curved toward an inside part of the circle S, resulting in that this axial line becomes $n'_{ji}$.

As a result, the circle S is entirely shrunk inwardly and when its radius becomes smaller than a radius $R_t$ of the circle T, it can be inserted into the hole T of the objective member (refer to FIG. 2)

Then, in the case that the shaft member and the objective member are stored at the predetermined positions, the inner arc $n_i$ substantially curved toward the inside of the circle S under application of a compressive force of the aforesaid outer arc $m_i$ has stored a resilient energy therein through its curved deformation, resulting in that its restitution force is realized.

A bending moment generated with the restitution force is expressed by the following Equations (1) and (2);

$$M_{ni} = EA_{ni}\kappa_{ni}\rho_{nti}^2\left(\frac{1}{\rho_{nsi}} - \frac{1}{\rho_{nti}}\right)$$ Equation (1)

$$M_{mi} = EA_{mi}\kappa_{mi}\rho_{mti}^2\left(\frac{1}{\rho_{msi}} - \frac{1}{\rho_{mti}}\right)$$ Equation (2)

where the radii of curvature before curvature are defined as $\rho_{nsi}$ and $\rho_{msi}$ and the radii of curvature after curvature are defined as $\rho_{nti}$, $\rho_{mti}$.

Thus, the radii of curvature of each of the arcs $\rho_{nsi}$, $\rho_{msi}$ can be set under application of these associated equations in such a way that a resilient restitution force $F_t$ generated between the shaft member and the inner wall surface of the hole of the objective member is adapted for a force $F_o$ required for a fitting between the shaft member and the objective member by a bending moment $M_r$.

Accordingly, an appropriate coupling force is realized in each of the cases as described as follows.

At first, (1) In the case that both ends of the shaft member are fitted to the bearing holes of a ball bearing, the radii of curvature $\rho_{nsi}$, $\rho_{msi}$ of the inner arc $n_i$ and the outer arc $m_i$ are set to satisfy a relation of $F_t < F_{o1}$, so that an inner clearance of the bearing is not made narrow with an excessive pushing force, a fatigue life, vibration, noise and occurrence of heat or the like are not produced (refer to FIG. 8(A)).

(2) In the case of the paper feed roller and the like:

In the case that the paper feed roller or the paper presser roller is installed at an intermediate predetermined position, the radii of curvature $\rho_{nsi}$, $\rho_{msi}$ of the inner arc $n_i$ and the outer arc $m_i$ are set to satisfy a relation of $F_t > F_{o2}$, so that it can endure against a load generated as the paper feeding or the paper pressing is carried out (refer to FIG. 8(B)).

(3) In the case that a ball bearing and a paper feed roller are made to be combined:

After the radii of curvature $\rho_{nsi}$, $\rho_{msi}$ of the inner arc $n_i$ and the outer arc $m_i$ are set to satisfy a relation of $F_{o1} > F_t > F_{o2}$, or the radii of curvature $\rho_{nsi}$, $\rho_{msi}$ are set to satisfy a relation of $F_t < F_{o1}$, the inner diameter of the hole of the roller is set to a lower value to satisfy a relation of $F_t > F_{o2}$. Accordingly, the inner clearance of the bearing of the ball bearing is not made excessively narrow and it can endure against a load generated at the paper feeding roller (refer to FIG. 8(C)).

Further, between the aforesaid objective member and the shaft member, for example, between the ball bearing and the shaft member, high circularity is required to keep a smooth rotation.

In order to obtain high circularity, in the present invention, when the symmetrical lines $C_1$, $C_2$, $C_3$ ... of the inner arcs $n_1$, $n_2$, $n_3$ ... are extended, they may pass through the center O of the circle S and an angle between the lines is set to be equal (refer to FIG. 6).

As a result, a direction of restitution force generated by the curvature of the aforesaid inner arcs $n_i$, $n_2$, $n_3$ ... is directed toward the center point O of the circle S and forces of three or more directions act on it under an equal angle, so that a sum of forces is concentrated on the center point O of the circle S. Accordingly, the center point O of the circle S becomes a center point of force and this causes to provide high circularity, when the shaft member is rolling.

Embodiment 1

A hollow cylinder with material of SUS304, its length of 1500 mm, its outer diameter of 12 mm and its thickness of 0.6 mm was prepared, this cylinder was once drawn with an outer die into an intermediate 3-groove type, thereafter finally this was formed with a male or female mold die type drawing die.

As a result, there was attained a hollow shaft member in which three inner arcs with a radius of 0.8 mm were formed at a circle with an outer diameter of 8.03 mm and thickness of 0.5 mm, their symmetrical lines were crossed at the center of a circle, they were directed in 120° from each other.

At first, after the extremity end of the shaft member was cut into a tapered surface against the paper feed roller having holes with an inner diameter of 7.95 mm punched therein, the shaft member was press fitted by an inserting machine under utilization of hydraulic pressure and then the shaft member was inserted under compression at the outer arc and the inner arc and both of them were coupled to each other by the resilient restitution force generated when inserted into a objective member.

Then, the extremity end of the shaft member was cut into a tapered surface against the ball bearing with material of W688EP2ZU (for bearing 8 m/m) having bearing holes with an inner diameter of 7.995 mm) in the same manner as that described inserting machine under utilization of hydraulic pressure, thereby both of them were coupled to each other in the same manner as described above.

As a result, the paper feed roller could endure against a torque of about 1.96 N.m. In addition, the ball bearing showed that the inner clearance could be kept in a range of theoretical value. High circularity was sufficiently satisfied.

What is claimed is:

1. A hollow shaft member made of metallic material to be fitted to an objective member such as a bearing member having holes therein, wherein said hollow shaft member circular sectional plane is divided into three or more outer arcs, $m_1$, $m_2$, $m_3$ ... and three or more inverse directed inner arcs, $n_1$, $n_2$, $n_3$ ... said inner arcs formed among said outer arcs, and said hollow member is inserted into said objective member causing said outer arcs and said inner arcs to be compressed inwardly and be deformed, thereby coupling said objective member and said shaft member together using a resilient restitution force that is generated by said compression and deformation, and said outer arcs $m_1$, $m_2$, $m_3$ ... and inner arcs $n_1$, $n_2$, $n_3$ further having the following relationships between said shaft and said objective member:

(1) $R_s > R_t$, wherein
 $R_s$ is the radius of a sectional circle of said shaft member before its installation in said objective member,
 $R_t$ is the inner radius of hole of said objective member to which said shaft member is fitted, and (2) a relation of $(Lm_1 + Lm_2 + Lm_3 ...) < 2\pi R_t$, wherein
 $R_t$ is the inner radius of the hole of said objective member to which the shaft is fitted and
 $L_{mi}$ is the length of one of said outer arc $m_{1(i=1, 2, 3 ...)}$ and (3) the Radii of curvature $\rho_{nsi}$, $\rho_{msi}$ of each of the arcs is defined such that a resilient restitution force $F_t$ generated between said shaft member and said inner wall surface of the hole of said objective member is created by bending moments $M_{ni}$ and $M_{mi}$ and said force $F_t$ is adapted for coupling said shaft member and said objective member, and wherein $$\left(M_{ni} = EA_{ni}\kappa_{ni}\rho_{nti}^2\left(\frac{1}{\rho_{nsi}} - \frac{1}{\rho_{nti}}\right)\right) \text{ wherein}$$

$\rho_{nsi}$ is the radius of curvature of the axial line of one of said inner arcs before its curved deformation, $\rho_{nti}$ is the radius of curvature of the axial line of one of said outer arcs after its curved deformation fitted to said objective member, E is the longitudinal elasticity of said shaft member, $A_{ni}$ is the unit sectional area per a unit of length of said inner arc, $\kappa_{ni}$ is the sectional coefficient of the inner arc by a bending moment $M_{ni}$ (i=1, 2, 3 . . . ) generated at the inner arc when said shaft member is compressed and deformed; and $$\left(M_{mi} = EA_{mi}\kappa_{mi}\rho_{mti}^2\left(\frac{1}{\rho_{msi}} - \frac{1}{\rho_{mti}}\right)\right) \text{ wherein}$$

$\rho_{msi}$ is the radius of curvature of the axial line of the outer arc before its curved deformation, $\rho_{mti}$ is the radius of curvature of the axial line of the outer arc after its curved deformation fitted to said objective member, E is the longitudinal elasticity of said shaft member, $A_{mi}$: is the unit sectional area of the outer arc by a bending moment $M_{mi}$ (i=1, 2, 3 . . . ) generated at the outer arc when said shaft member is compressed and deformed, and further wherein;

the extensions of the symmetrical lines $C_1$, $C_2$, $C_3$ of said inner arcs $n_1$, $n_2$, $n_3$ pass through a center 0 of a circle S and the symmetrical lines $C_1$, $C_2$, $C_3$ are crossed to each other at an equal angle.

2. The hollow shaft member according to claim 1, wherein there are formed three inverse directed inner arcs.

3. A hollow shaft member according to claims to 1, wherein said metallic material comprises stainless steel.

4. A hollow shaft member according to claims to 2, wherein said metallic material comprise stainless steel.

* * * * *